United States Patent
Hao et al.

(10) Patent No.: US 7,037,265 B2
(45) Date of Patent: May 2, 2006

(54) METHOD AND APPARATUS FOR TISSUE HARMONIC IMAGING WITH NATURAL (TISSUE) DECODED CODED EXCITATION

(75) Inventors: Xiaohui Hao, Waukesha, WI (US); Richard Chiao, Menomonee Falls, WI (US); Steven Miller, Waukesha, WI (US); Yadong Li, Waukesha, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 276 days.

(21) Appl. No.: 10/679,542

(22) Filed: Oct. 6, 2003

(65) Prior Publication Data
US 2005/0054925 A1    Mar. 10, 2005

Related U.S. Application Data

(60) Provisional application No. 60/501,784, filed on Sep. 9, 2003.

(51) Int. Cl.
*A61B 8/00*    (2006.01)
(52) U.S. Cl. ........................................ 600/447
(58) Field of Classification Search ................ 600/443, 600/447, 458; 73/625, 626; 367/100–102
See application file for complete search history.

(56) References Cited

U.S. PATENT DOCUMENTS

| | | | |
|---|---|---|---|
| 5,706,819 A | 1/1998 | Hwang et al. | 128/662.02 |
| 6,066,099 A | 5/2000 | Thomenius et al. | 600/447 |
| 6,213,947 B1 | 4/2001 | Phillips | 600/443 |
| 6,241,674 B1 * | 6/2001 | Phillips et al. | 600/443 |
| 6,375,618 B1 * | 4/2002 | Chiao et al. | 600/447 |
| 6,436,046 B1 | 8/2002 | Napolitano et al. | 600/447 |

OTHER PUBLICATIONS

Misaridis et al., "An effective coded excitation scheme based on a predistorted FM signal and an optimized digital filter," Center for Fast Ultrasound Imaging, Department of Information Technology; Technology University of Denmark.

Philips, Ultrasound—Philips HDI 5000 System, Nov. 21, 2005, http://www.medical.philips.com/main/products/ultrasound/general/philips_5000.

Simens Medical Solutions Brochure, Acuson Sequoia Echocardiology System Signature II Option, 2002 Simens Medical Solutions.

Hamilton, Mark F. and Blackstock, David T., eds. 1998, *Nonlinear Acoustics*, San Diego, CA:Academic Press.

* cited by examiner

*Primary Examiner*—Francis J. Jaworski
(74) *Attorney, Agent, or Firm*—McAndrews, Held & Malloy, Ltd.; Peter I. Vogel; Michael A. Dellapenna (57) ABSTRACT

The present invention relates to a method and apparatus providing tissue harmonic imaging using an ultrasound machine. Coded pulses and the phase inverted version of the said coded pulses with time bandwidth greater than 1 are transmitted into the tissue. Backscattered echoes are received and filtered before or after coherent summation. Decoding/compressing of the received echoes of the coded pulses is implemented naturally through the propagation of the specially designed ultrawide band (>80%) waveforms inside tissue and pulse inversion. Costly decoding/compression filter are not necessary.

36 Claims, 7 Drawing Sheets

Spectrum of the Ultra-wide band pulse and a regular pulse with the same time duration and center frequency

- - - - - Probe
———— Spectrum of Ultra-wide band design
— — — Spectrum of the regular pulse with same time duration

METHOD AND APPARATUS FOR TISSUE HARMONIC IMAGING WITH NATURAL (TISSUE) DECODED CODED EXCITATION

RELATED APPLICATIONS

This application is related to, and claims benefit of and priority from, Provisional Application No. 60/501,784 filed on Sep. 9, 2003, titled "Method and Apparatus for Tissue Harmonic Imaging with Natural (Tissue) Decoded Coded Excitation", the complete subject matter of which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

This application is directed in general to imaging using an ultrasound machine. This application is directed in particular to tissue harmonic imaging using an ultrasound machine.

Tissue harmonic imaging is a known imaging method used in ultrasound machines. Such imaging was started based on a perceived need to improve the effectiveness of acoustic contrast agents, where the backscattered signal is rich in harmonics. Once introduced into clinical practice, it became obvious that images could be obtained without the introduction of contrast, and that furthermore these images demonstrated gains in image clarity. Tissue harmonic imaging was therefore established as an imaging mode in its own right. Previously, two methods were generally used in generating tissue harmonic imaging, such methods comprising single firing band pass filtering and multiple firing pulse/phase inversion.

In a known single firing method, the harmonic components are extracted by applying a band pass filter to the received signal. However, using band pass filtering may limit the bandwidth. For example, the bandwidth of the transmit signal and the band pass filter must be limited to separate the fundamental spectrum and harmonic bands. A filter cutoff must be selected, representing a trade off between loss of harmonic signal and contamination from the fundamental spectrum. The limitation of the probe bandwidth will force the use of a narrowed transmit fundamental band. A narrow bandwidth may require lengthening the transmit pulse and filter impulse response, which, in turn, may result in a degradation of axial resolution.

The limitations of known single firing harmonic band pass filtering has been largely overcome using pulse (phase) inversion as disclosed in U.S. Pat. No. 5,706,819 issued Jan. 13, 1998. Known phase inversion method uses two or more sequential pulses, directed along the same path but with the inverted polarities. The coherent sum of the backscattered signal resulting from these firings eliminates the odd harmonics (including the fundamental) while keeping the even harmonics (including the second harmonic) used to form images. Phase inversion imaging enables broadband pulses, thus spatial resolution to be retained for harmonic imaging. However, for regular pulses, broadband means short pulse length, which in turn, results in a loss of penetration especially in harmonic imaging where the second harmonic signal is about 20 dB less than the fundamental signal. Further, requirement of double or multiple firing along the same beam path reduce the frame rate in phase inversion case.

It is advantageous to have the resolution associated with pulse inversion harmonic imaging while keeping the frame rate, penetration and signal to noise ratio (alternatively referred to as "SNR") associated with single firing harmonic imaging. However, several major challenges are contemplated. First, it is always a challenge to obtain sufficient penetration and improved SNR while maintaining good resolution. For fundamental imaging, frequency modulated signals (e.g., chirp) have been employed with high time-bandwidth product. This approach may result in greater penetration and improved SNR with the same bandwidth as conventional pulses after proper decoding to avoid significant range lobes and maintain good axial resolution. In U.S. Pat. No. 6,213,947B1 issued Apr. 10, 2001, discloses using of a matched filter which is designed for the highest SNR achievement for frequency/"nonlinear phase" modulated coded excitation. The decoding filter may be applied to RF signals, which have a very high sampling frequency, or to demodulated RF signals using complex filter coefficients. In both cases, the decoding filter is quite large and costly. The cost issue prevents most of the current ultrasound companies from implementing the frequency/nonlinear phase modulated coded excitation even in their premium ultrasound machines. Even if the cost were acceptable, the decoding filter with a matched design may not work as planned most of the time, especially for harmonic imaging. This is due to the fact that in harmonic imaging, the decompressing becomes more difficult since the phases change twice as fast, as a function of time, compared to the fundamental, and the complexity of the generation of tissue harmonic through generally heterogonous tissue severely degrade the effectiveness of the matched compression filtering, which is always designed based on ideal situations. As a result, the range side lobe level could be very high, which does not make sense for practical applications of ultrasound imaging. A mismatched filter (similar to that disclosed by T. X. Misaridis and J. A. Jensen, in the paper titled *An Effective Coded Excitation Scheme Based On A Predistorted FM Signal And An Optimized Digital Filter*), which targets on decreasing the range side lobe level with some sacrificing of SNR, may be helpful for decoding.

Another challenge in harmonic imaging is the near field harmonic performance. Harmonic signals in tissue are different from local nonlinearity of micro bubbles as the tissue harmonic signals are generated gradually during propagation. Thus, for very near field (e.g., less than about 2 cm) there may not be enough harmonic components generated in tissue. Generally, this causes blooming-like image characteristics where a thin line could appear as a thick block due to either saturation of the over-gained small second harmonic signal or leakage of the fundamental signal especially in high frequency case. This phenomenon seriously limits the application of harmonics in near field structure such as small parts and superficial structure with high frequency probes.

The third challenge is the frame rate. Phase inversion techniques generally sacrifice frame rate since multiple firings are required per beam position. Several patents disclose frame rate improvement, for example U.S. Pat. No. 6,436,046 B1 issued Aug. 20, 2002 and U.S. Pat. No. 6,066,099 issued May 23, 2000. These patent documents include, for example, the multi-line acquisition (a plurality of receive beams are associated with one of the transmit beams), spatially adjacent transmission of phase inverted vectors, and simultaneously multiline transmission.

Thus there exists a need to provide high quality harmonic imaging capability throughout the field of view, in a way that solves these challenges.

BRIEF SUMMARY OF THE INVENTION

One embodiment of the present invention relates to tissue harmonic imaging using an ultrasound machine. At least one embodiment of the invention uses wideband (BW greater than about 80%) coded excitation transmit signals with time bandwidth product greater than about 1 for harmonic imaging. At least one embodiment employs pulse inversion for removing fundamental signals, and further employs at least one of the Multi-line acquisition, Phase alternating in space, and Multi-line transmission methods (or a combination of two or more of such methods) to avoid the frame rate drop caused by double firing as provided previously. The wideband transmit signal improves the harmonic imaging performance in very near field while at the same time increases the penetration and SNR compared to a normal pulse inversion method where regular pulses (time bandwidth product=1) are employed. Decoding of the receiving signal is naturally implemented through propagation of coded pulses inside tissue and pulse inversion.

It is contemplated that embodiments of this invention may greatly improve the image resolution compared to single firing band pass filtering harmonic imaging method while maintaining the same or even better penetration and SNR as in single firing harmonic imaging, which greatly surpass the penetration of regular pulse inversion harmonic imaging.

It is also contemplated that embodiments of this invention employ one or more of the Multi-line acquisition, Phase alternating in space, and Multi-line transmission methods (or a combination of two or more of such methods) transmission methods. As a result, no frame rate sacrificing is necessary for the much higher resolution benefit compared to the single firing band pass filtering harmonic imaging.

One embodiment of the present invention relates to a method for conducting harmonic imaging without using a matched decoding and compressing filter. This embodiment of the comprises transmitting a coded pulse having a time bandwidth product greater than about 1 and a phase inverted version of the coded pulse and receiving at least a backscattered echo of the coded pulse and at least a backscattered echo of the phase inverted version of the coded pulse. At least the backscattered echo of the coded pulse and the backscattered echo of the phase inverted version of the coded pulse are coherently summed.

Another embodiment of the present invention relates to a method for conducting harmonic imaging using an ultrasound machine without using a matched decoding and compressing filter. This embodiment of the method comprises transmitting at least one coded pulse having a time bandwidth product greater than about 1 along a transmit beam path and receiving at least two backscattered echoes of the transmitted coded pulse along opposing sides of the transmit beam path. The method further comprises forming at least one phase inverted version of the at least one coded pulse, transmitting the at least one phase inverted version of the at least one coded pulse and receiving at least two backscattered echoes of the at least one phase inverted version of the coded pulse along opposing sides of a transmit beam path. The at least two backscattered echoes of the coded pulse and the at least two backscattered echoes of the phase inverted version of the coded pulse are coherently summed.

Still another embodiment of the present invention relates to a method for conducting harmonic imaging using an ultrasound machine without using a matched decoding and compressing filter. This embodiment of the method comprises transmitting at least one coded pulse having a time bandwidth product greater than about one along a first beam path and receiving at least one backscattered echo of the transmitted coded pulse. The method further comprises forming at least one phase inverted version of the at least one coded pulse, transmitting the at least one phase inverted version of the at least one coded pulse along a second beam path and receiving at least one backscattered echo of the at least one phase inverted version of the coded pulse. The at least one backscattered echo of the coded pulse and the at least one backscattered echo of the phase inverted version of the coded pulse are coherently summed, forming at least a received echo along a third beam path in spaced relationship to the first and second beam paths.

Yet another method of the present invention relates to a method for conducting harmonic imaging using an ultrasound machine without using a matched decoding and compressing filter. This embodiment of the method comprises simultaneously transmitting at least two coded pulses having a time bandwidth product greater than about 1 along two separate beam paths and receiving at least two backscattered echoes of the two transmitted coded pulses. The method further comprises forming at least two phase inverted versions of the coded pulses, simultaneously transmitting the two phase inverted versions of the coded pulses along the two beam paths and receiving at least two backscattered echoes of the two phase inverted versions of the coded pulses. The at least two backscattered echoes of the coded pulses and the at least two backscattered echoes of the two phase inverted versions of the coded pulses are coherently summed, forming at least two summed echoes along the two beam paths.

One or more embodiments of the methods described previously may further comprise filtering using a filter which passes at least one selected frequency and blocks one or more other frequencies. It is contemplated that such filtering may occur prior to or after the coherent summation. One or more other embodiments comprise decoding the at least one coherent sum of the backscattered echoes, wherein such decoding occurs naturally through propagation of the one or more coded pulses and one or more phase inverted versions of the coded pulses inside tissue and the coherent summation of one or more backscattered echoes of the coded pulses and the one or more backscattered echoes of the phase inverted versions of the coded pulses. Still other embodiments may comprise selecting a center frequency of the at least one pulse such that a second harmonic signal is generated having a center frequency falling within a predetermined bandwidth range of a probe.

One embodiment of the present invention comprises an ultrasound apparatus for providing tissue harmonic imaging of tissue using natural decoded coded excitation without using a matched decoding and compressing filter. This embodiment of the apparatus comprises a probe arranged to transmit at least one coded pulse and a phase inverted version of the coded pulse into tissue, generating at least one received signal in response to at least one echo of the coded pulse and the phase inverted version of the coded pulse backscattered from the tissue. The apparatus further comprise a coherent summation module adapted to coherently summing at least one of the backscattered echoes of the coded pulse and one of the backscattered echoes of the phase inverted version of the coded pulse forming at least one coherent sum.

At least one embodiment of the apparatus comprises a filtering module coupled to at least the coherent summation module and adapted to pass at least one selected frequency and block one or more other frequencies. It is contemplated that the filtering module may comprise at least one of a bandpass filter, a base band low pass filter and a mismatched filter or sum combination thereof.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

For the purpose of illustration only, the following detailed description references a certain embodiment of an ultrasound machine, apparatus or device. However, it is understood that the present invention may be used with other devices or imaging systems.

One or more embodiments of the present invention attempts to solve the three challenges discussed previously with respect to current tissue harmonic imaging implementations: 1) trade-off between penetration, SNR and resolution; 2) near field harmonic performance; and 3) frame rate drop with multiple firing for higher resolution. Embodiments of the present invention solve these challenges using frequency modulated coded excitation pulses in combination with pulse inversion, where the waveforms have a time bandwidth product greater than about 1, and a bandwidth greater than about 80%. It is contemplated that no costly matched decoding/compressing filter are used for decoding.

Figure 1:
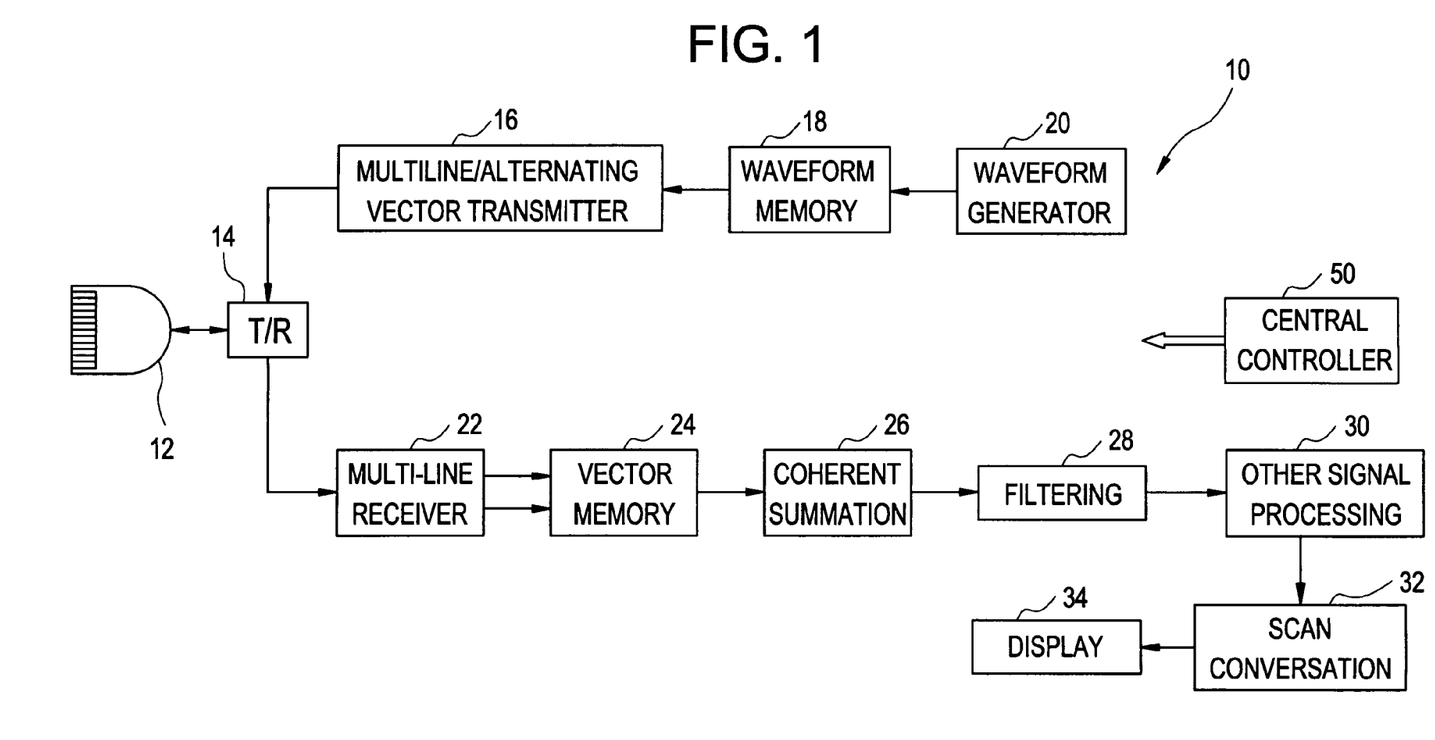
FIG. 1 illustrates a block diagram of an embodiment of an ultrasound machine made in accordance with certain embodiments of the present invention.

FIG. 1 illustrates an ultrasound apparatus, device or machine, generally designated 10, in accordance with embodiments of the present invention. A probe/transducer 12 transmits one or more ultrasound pulse waves (coded pulses and/or phase inverted versions of the coded pulses for example) into a subject (live tissue for example) by converting electrical analog signals to ultrasonic energy. In at least one embodiment the probe/transducer 12 receives the one or more backscattered ultrasound echoes (echoes of the coded pulses and/or phase inverted versions of the coded pulses for example) from the subject by converting ultrasonic energy to analog electrical signals.

In at least one embodiment, the ultrasound device 10 comprises a transmit/receiver switch 14 coupled to and communicating with at least probe/transducer 14. The transmit/receiver switch 14 is adapted to enable the ultrasound device 10 and the probe/transducer 14 switch between transmitting and receiving modes. For example using the switch, enables the probe/transducer 12 to transmit the one or more ultrasound pulse waves and receive the one or more backscattered echoes as appropriate.

At least one multiline/alternating vector transmitter device or module 16 is illustrated coupled to and communicating with at least the transmit/receiver switch 14. The transmitter module 16 is adapted to transmit one or more pulses (including both pulse and phase inverted versions of the pulses) along one or more lines or beam paths in accordance with embodiments of the invention as provided below. FIG. 1 further illustrates at least one waveform memory 18 coupled to and communicating with at least the transmitter module 16 and a waveform generator 20. In accordance with one embodiment of the present invention, waveform generator 18 generates at least one or more ultrasound pulse waves and the one or more phase inverted versions of the pulse waves, which may be saved and stored in the waveform memory 18 prior to transmission.

At least one embodiment of the present invention comprises at least one multi-line receiver 22 coupled to and communicating with at least transmit/receiver switch 14. The receiver 22 is adapted to receive one or more echoes or echo beams of the transmitted pulses (including echoes of the pulses and phase inverted versions of the pulses) along one or more lines or paths in accordance with embodiments of the invention as provided below. The multi-line receiver 22 is further illustrated coupled to and communicating with a vector memory 24. In this embodiment, vector memory is adapted to receive, save and store one or more echoes (including one or more echoes of the pulses and phase inverted versions of the pulses).

A coherent summation module or device 26 is illustrated coupled to and communicating with at least vector memory 24. The module or device 26 is adapted to coherently sum at least one backscattered echo of a pulse with at least one backscattered echo of a phase inverted version of the pulse as provided below. The coherent summation module 26 is illustrated coupled to and communicating with a filtering module or device 28 (a bandpass filter for example). In one or more embodiments of the present invention, the filtering module 28 filters at least the coherent summation of backscattered echo of the pulse and backscattered echo of the phase inverted version of the pulse using one or more filters, which pass selected frequencies and stop other frequencies. It is understandable that the module 26 and module 28 may be switched in position such that the filtering for each backscattered echo may happen before the coherent summation depending on the implementation. It is also contemplated that filtering module 28 does not use a matched decoding/decompressing filters to accomplish such filtering. It is further contemplated that filtering module 28 may use a mismatched filter for improved range side lobe levels.

FIG. 1 further illustrates an other signal processing module or device 30 coupled to and communicating with at least the filtering module 28. It is contemplated that the other signal processing module or device 30 is adapted to provide or perform any other required or desired signal processing. The other signal processing module or device 30 is illustrated coupled to and communicating with a scan conversion device 32 which in turn is illustrated coupled to and communicating with display 34. Scan conversion device 32 is adapted, in one embodiment, to provide scan-conversion functions, color mapping functions, and tissue/flow arbitration functions and formats the data for display. Display 32 accepts the data from the scan conversion device 32 and displays the resultant image.

At least one embodiment of the present invention comprises a central controller or control processor 50, which may comprise the main, central processor of the ultrasound machine 10, interfacing to various other components of the ultrasound machine 10. Central controller 50 executes the various data algorithms and functions for the various imaging and diagnostic modes. Digital data and commands may be communicated between central controller 50 and one or more of the components of the ultrasound machine 10. As an alternative, the functions performed by central controller 50 may be performed by multiple processors or a combination thereof. As a further alternative, the functions of central controller 50 may be integrated into a single PC backend.

Although not illustrated, it is contemplated that at least one embodiment of the present invention comprises a user interface, enabling user commands to be input by the operator to the ultrasound machine 10. Such user interface may comprise a keyboard, mouse, switches, knobs, buttons, track balls, foot pedals, a microphone for inputting voice commands and on-screen menus, among other devices At least one embodiment of the present invention uses ultra-wideband coded waveforms with phase inversion. Such ultra-wideband waveforms decode naturally through propagation inside tissue and phase inversion. It is further contemplated that at least one of the coded waveforms may be linear or nonlinear frequency modulated signals. In at least one embodiment, one or more of the coded waveforms may be linear frequency modulated signals and one or more of the other coded waveforms may be nonlinear frequency modulated signals. At least one or more embodiments of the present invention solves the previously disclosed challenges existing in known tissue harmonic imaging methods.

At least one embodiment of the present invention uses a transmitted waveform design. In at least one embodiment, the transmitted waveform design comprises a time bandwidth product greater than 1, typically, with fractional bandwidth (alternatively referred to as "BW") greater than about 80%. In this embodiment, the waveform may be amplitude and frequency modulated. Amplitude modulation may be applied in the form of a window function, such as Gaussian shading for example. Frequency modulation may be linear (as in a chirp for example) or non-linear. The center frequency of the pulse is selected in a way that the generated second harmonic signal will have a center frequency falling within the −12 dB bandwidth range of the probe. Embodiments of the present invention use frequency modulated coded excitation pulses in combination with pulse inversion, where the waveforms have a time bandwidth product greater than about 1, and a bandwidth greater than about 80%. It is also contemplated that the bandwidth of the waveforms may not have to be greater than 80% depending on the real application issue.

Figure 2:
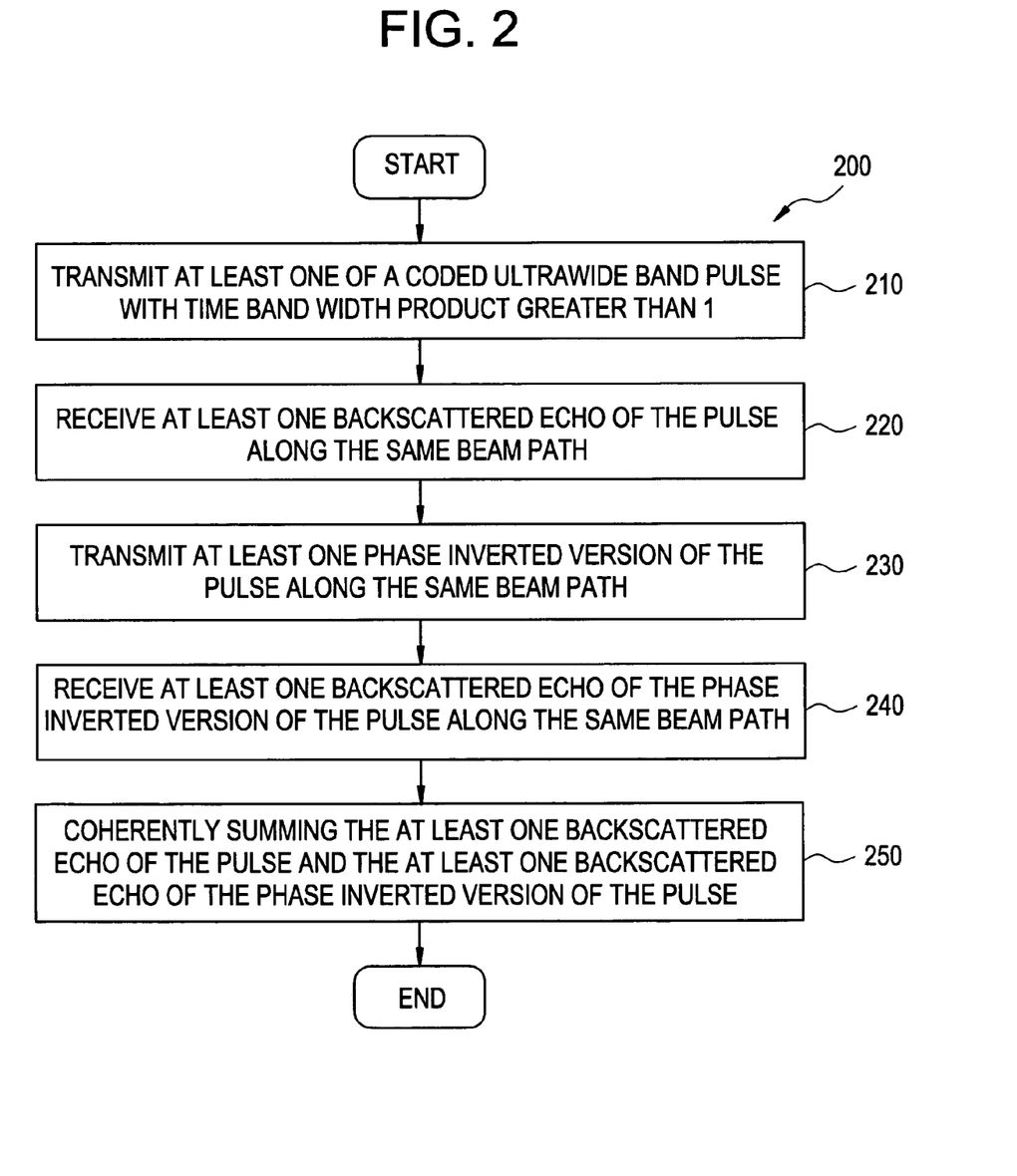
FIG. 2 illustrates a flow diagram depicting a method for conducting tissue harmonic imaging using an ultrasound machine or device (similar to that illustrated in FIG. 1) using natural decoded coded excitation with certain embodiments of the present invention.

FIG. 2 illustrates a high level flow diagram depicting a method for conducting tissue harmonic imaging, generally designated 200 with natural decoded coded excitation (using an ultrasound machine or device similar to that illustrated in FIG. 1) with certain embodiments of the present invention. In at least one embodiment, a specifically designated waveform (using pulse inversion) is used to perform tissue harmonic imaging. More specifically, method 200 comprises Step 210, comprising transmitting at least one of a coded pulse (an ultrawide band pulse having a bandwidth greater than about 80% for example) having a time bandwidth product greater than about 1.

Step 220 comprises receiving at least one of a backscattered echo of the coded pulse (along the same beam path for example). Step 230 comprise transmitting at least one phase inverted version of the coded pulse (along the same beam path for example). Step 240 comprises receiving at least one backscattered echo of the phase inverted version of the coded pulse (along the same beam path for example). In at least one embodiment, method 200 further comprises Step 250, which comprises coherently summing at least one of the backscattered echoes of the coded pulse with at least one of the backscattered echoes of the phase inverted version of the coded pulse forming at least one coherent sum. In at least one embodiment, it is contemplated that the coherent sum of at least one backscattered echo of the coded pulse and at least one of the backscattered echo of the phase inverted version of the coded pulse are filtered (using a bandpass filter for example). In another embodiment, it is contemplated that the at least one of the backscattered echo of the coded pulse and the backscattered echo of the phase inverted version of the coded pulse are filtered prior to being coherently summed. In at least one embodiment, at least the coded pulse comprises at least one of a frequency linear modulated pulse and frequency non-linear modulated pulse. Further, the coded pulse may be amplitude modulated or frequency modulated. It is further contemplated that a center frequency of the at least one pulse is selected such that a second harmonic signal is generated having a center frequency falling within a predetermined bandwidth range of a probe.

Figure 3:
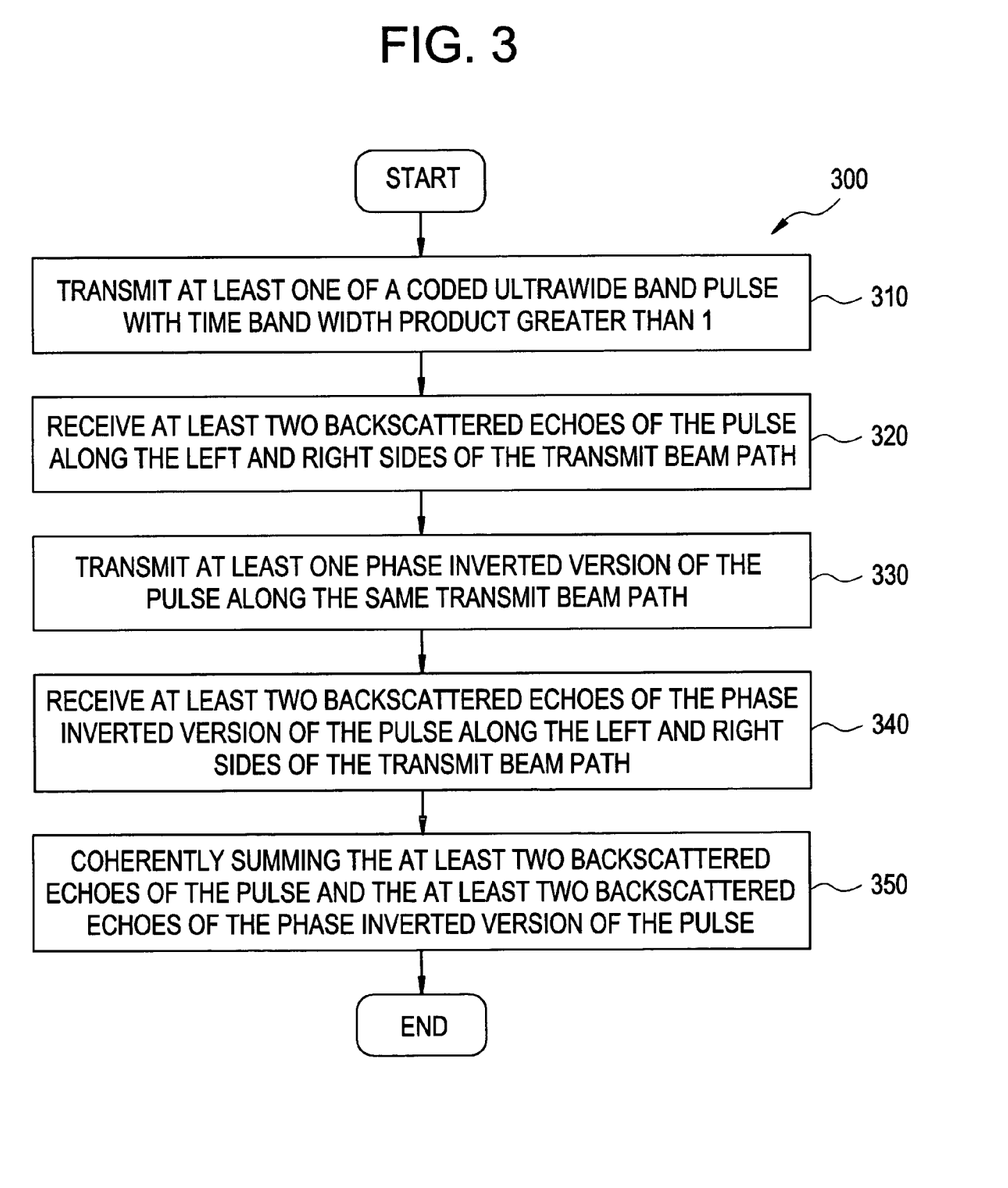
FIG. 3 illustrates a flow diagram depicting another method for conducting tissue harmonic imaging using an ultrasound machine or device (similar to that illustrated in FIG. 1) using natural decoded coded excitation with certain embodiments of the present invention.

FIG. 3 illustrates a flow diagram depicting a method, generally designated 300, for conducting tissue harmonic imaging with natural decoded coded excitation (using an ultrasound machine or device similar to that illustrated in FIG. 1) with certain embodiments of the present invention. In one embodiment, a specifically designated waveform (using pulse inversion) is used to perform tissue harmonic imaging. In at least one embodiment, method 300 comprises Step 310 comprising transmitting at least one coded pulse (an ultrawide band pulse having a bandwidth greater than about 80% for example) having a time bandwidth product greater than about 1. Step 320 comprises receiving at least two backscattered echo beams of the transmitted coded pulse along opposing sides (right and left sides for example) of a transmit beam path.

Step 330 comprises forming at least one phase inverted version of the at least one coded pulse and transmitting the at least one phase inverted version of the at least one coded pulse (along the same transmit beam path for example). Step 340 comprises receiving at least two backscattered echo beams of the at least one phase inverted version of the coded pulse along opposing sides (the right and left sides for example) of the transmit beam path.

Method 300 further comprises Step 350, coherently summing at least two backscattered echo beams of the coded pulse and the at least two backscattered echo beams of the phase inverted version of the coded pulse forming at least two coherent sums. It is contemplated that, in at least one embodiment, the coherent summation of at least two backscattered echo beams of the coded pulse with the at least two backscattered echo beams of the phase inverted version of the coded pulse are filtered (using a bandpass filter for example). It is also contemplated that the at least two backscattered echo beams of the coded pulse and the at least two backscattered echo beams of the phase inverted version of the coded pulse are filtered prior to being coherently summed. In at least one embodiment, method 300 further comprises at least the coded pulse is a frequency linear modulated pulse and frequency non-linear modulated pulse and may be an amplitude modulated or a frequency modulated pulse.

Figure 4:
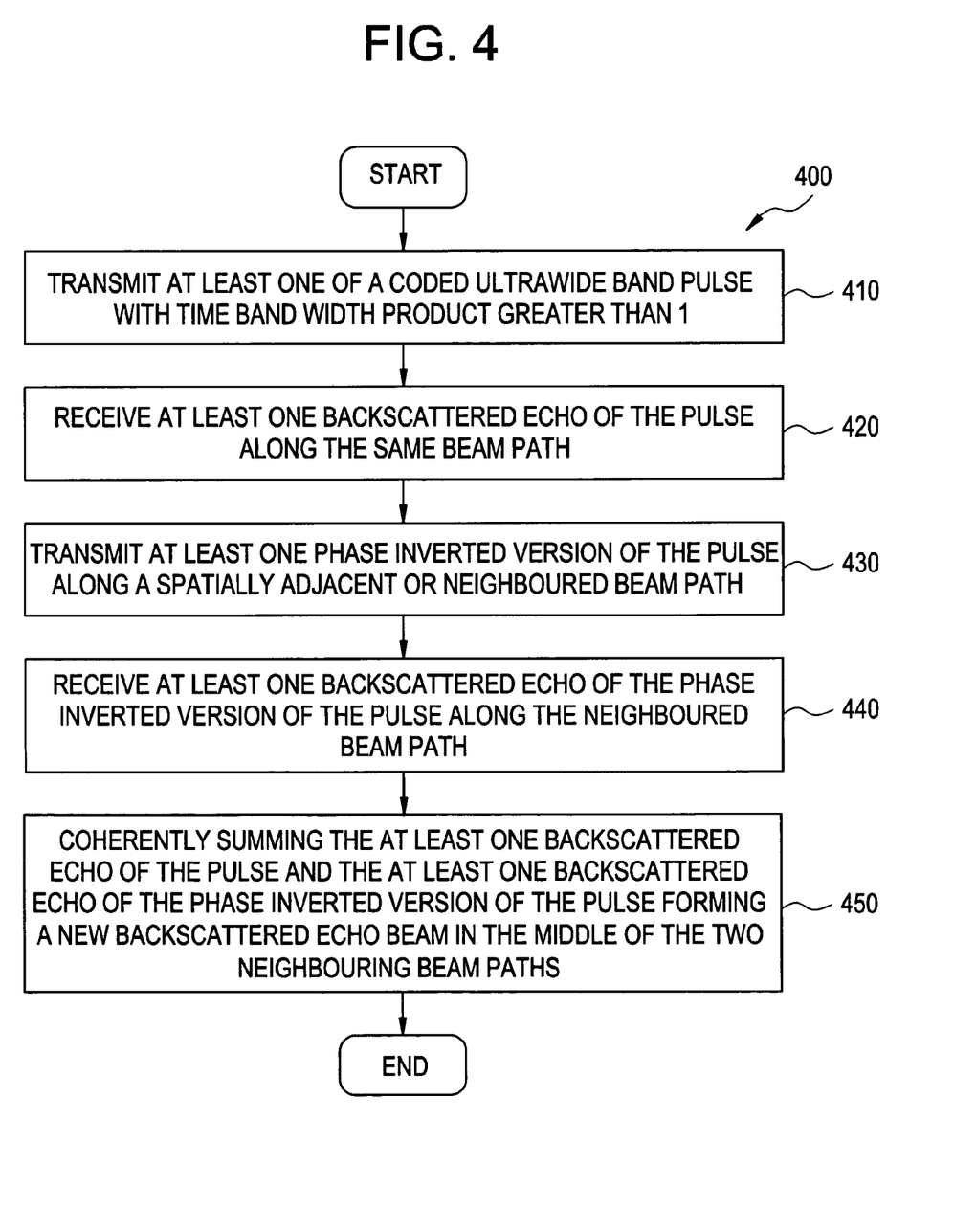
FIG. 4 illustrates a flow diagram depicting yet another method for conducting tissue harmonic imaging using an ultrasound machine or device (similar to that illustrated in FIG. 1) using natural decoded coded excitation with certain embodiments of the present invention.

FIG. 4 illustrates a flow diagram depicting a method, generally designated 400, for conducting tissue harmonic imaging with natural decoded coded excitation (using an ultrasound machine or device similar to that illustrated in FIG. 1) with certain embodiments of the present invention. In one embodiment, a specifically designated waveform (using pulse inversion) is used to perform tissue harmonic imaging. At least one embodiment method 400 comprises Step 410 comprising transmitting at least one coded pulse (an ultrawide band pulse having a bandwidth greater than about 80% for example) having a time bandwidth product greater than about 1 along a first beam path. Step 420 comprises receiving at least one backscattered echo beam of the transmitted coded pulse (long the same beam path for example).

Method 400 further comprises Step 430 comprising forming at least one phase inverted version of the at least one coded pulse and transmitting the at least one phase inverted version of the at least one coded pulse along a second beam path (where the second beam path is spatially adjacent or neighboring the first beam path for example). Step 440 comprises receiving at least one backscattered echo beam of the at least one phase inverted version of the coded pulse.

In at least one embodiment, method 400 comprises Step 450 comprising coherently summing the at least one backscattered echo beam of the coded pulse with the at least one backscattered echo of the phase inverted version of the coded pulse, forming a received echo beam along a third beam path. In one embodiment, the third beam path is in spaced relationship to both the first and second beam paths (in the middle of the neighboring first and second beam paths for example). It is contemplated that, in at least one embodiment, the received echo beam is filtered (using a bandpass filter for example). In another embodiment, the at least one backscattered echo beam of the coded pulse and the at least one backscattered echo of the phase inverted version of the coded pulse are filtered prior to being coherently summed. In at least one embodiment, method 400 further comprises at least the coded pulse is a frequency linear modulated pulse and frequency non-linear modulated pulse and may be an amplitude modulated or a frequency modulated pulse.

Figure 5:
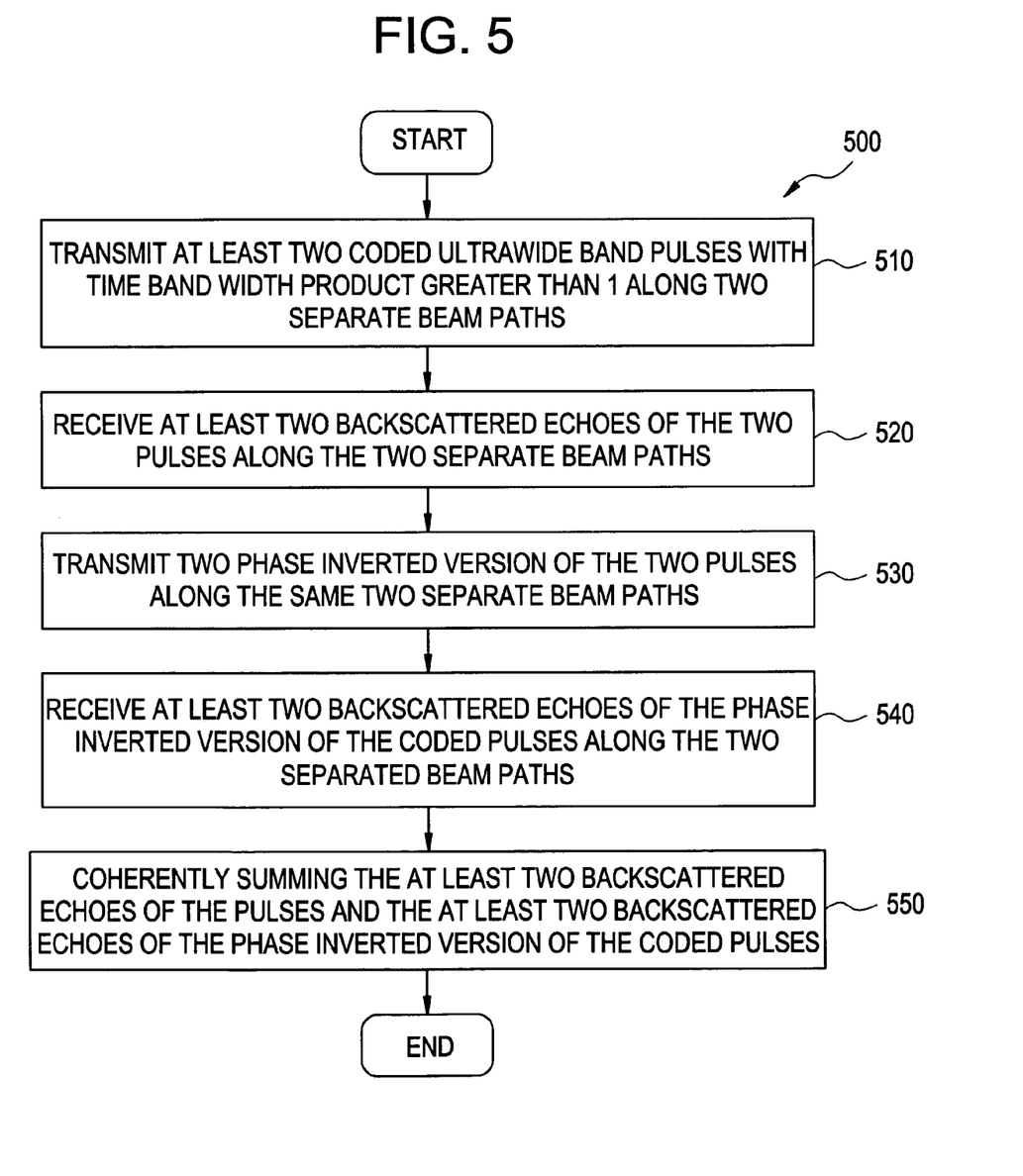
FIG. 5 illustrates a flow diagram depicting still another method for conducting tissue harmonic imaging using an ultrasound machine or device (similar to that illustrated in FIG. 1) using natural decoded coded excitation with certain embodiments of the present invention.

FIG. 5 illustrates a flow diagram depicting a method, generally designated 500, for conducting tissue harmonic imaging with natural decoded coded excitation (using an ultrasound machine or device similar to that illustrated in FIG. 1) with certain embodiments of the present invention. In one embodiment, a specifically designated waveform (using pulse inversion) is used to perform tissue harmonic imaging. At least one embodiment method 500 comprises Step 510 comprising simultaneously transmitting at least two coded pulses (an ultrawide band pulse having a bandwidth greater than about 80% for example) having a time bandwidth product greater than about 1 along two separate beam paths. The two separated beam paths are far enough apart to avoid acoustic cross talking.

Step 520 comprises receiving at least two backscattered echo beams of the two transmitted coded pulses (along the two separate beam paths for example). Step 530 comprises forming at least two phase inverted versions of the coded pulses and simultaneously transmitting the two phase inverted versions of the coded pulses (along the same two beam paths for example). Step 540 comprises receiving at least two backscattered echo beams of the two phase inverted versions of the coded pulses (along the same two separate beam paths for example).

In at least one embodiment, method 500 comprises Step 550 comprising coherently summing at least the two backscattered echo beams of the coded pulses with the at least two backscattered beams of said phase inverted versions of the coded pulses (forming two summed echoes beams along the same two beam paths for example). In at least one embodiment, the two summed echo beams are filtered (using a bandpass filter for example). In another embodiment, the at least two backscattered echo beams of the coded pulses and the at least two backscattered echo beams of the phase inverted versions of the coded pulses are filtered prior to being coherently summed. In at least one embodiment, the at least one phase inverted version of the coded pulse is formed for each of the coded pulses. It is further contemplated that the two beam paths are spatially separated.

Figure 6:
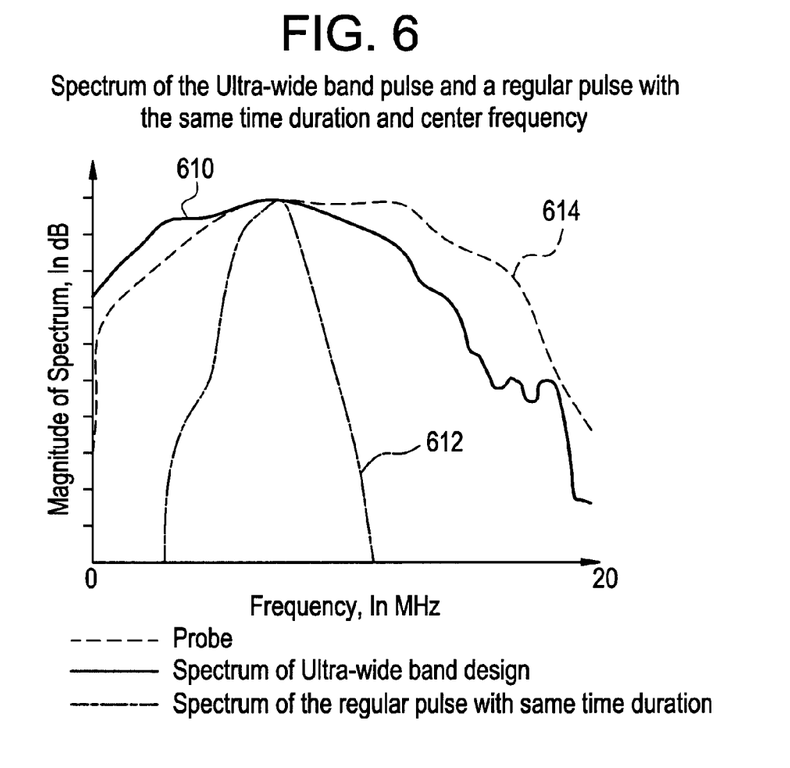
FIG. 6 illustrates an example of the designed transmit wave spectrum in accordance with certain embodiments of the present invention.

FIG. 6 illustrates an example of the spectrum of an ultra-wide band pulse and a regular amplitude modulated pulse with the same time duration and center frequency. A transmit wave spectrum of an ultra-wide band design (the solid line in FIG. 6 designated 610) is depicted in accordance with certain embodiments of the present invention. A regular pulse spectrum is shown (illustrated as a alternating long and short dashed line designated 612) for comparison with the designed transmit wave spectrum 610 of an ultra-wide band and having the same time duration. The dashed line, designated 614, depicts the bandwidth of the probe.

In at least one embodiment, double firing (i.e., pulse inversion) is employed. In such case, frame rate drop is an important issue. Three different embodiments of transmission methods used with the present invention are illustrated in FIGS. 7–9 to address the frame rate drop.

Figure 7:
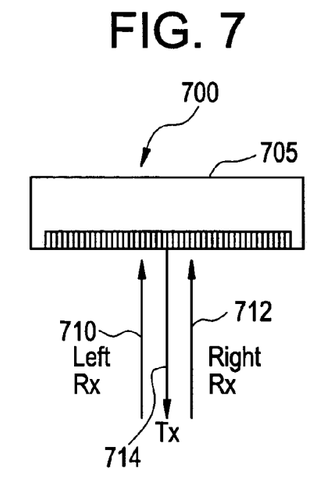
FIG. 7 illustrates a block diagram depicting one method for transmitting beams in accordance with certain embodiments of the present invention.

FIG. 7 illustrates using multi-line acquisition in accordance with at least one embodiment of the present invention. The illustrated embodiment, generally designated 700, uses multiple (2 or more) received beams per transmit beam. FIG. 7 depicts a probe 705 having two beams on the left and right sides (designated 710 and 712 respectively of the transmitted beam path 714.) It is contemplated that this embodiment may reduce the transmit vectors per frame by half or more, reaching the same receiving line density as conventional beamforming. Combining multi-line acquisition with pulse inversion (which comprises receiving multi-beams instead of one beam corresponding to one beam in both positive transmission and negative [phase inverted] transmission) helps restore the frame rate back to that associated with conventional single firing harmonic bandpass filtering while maintaining the benefits of pulse inversion harmonics.

Figure 8:
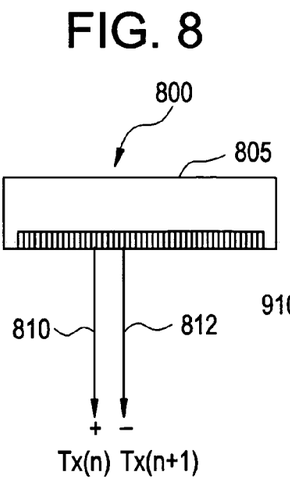
FIG. 8 illustrates a block diagram depicting another method for transmitting beams in accordance with certain embodiments of the present invention.

FIG. 8 illustrates another embodiment of the present invention. This embodiment comprises employing phase alternating in space. More particularly, this embodiment, generally designated 800, comprises a probe 805 that alternates the polarity phase of one or more waveforms for spatially transmit vectors. More particularly, FIG. 8 depicts two waveforms, Tx(n) (designated 810 having a positive polarity) and Tx(n+1) (designated 812 and having a negative polarity). It should be appreciated that, while only two waveforms are illustrated, more than two waveforms are contemplated. Further, it is contemplated that Tx(n) 810 may have a negative polarity while Tx(n+1) 812 may have a positive polarity. In at least one embodiment, the fundamental frequency component may be cancelled by performing a two beam coherent running average across the frame.

Figure 9:
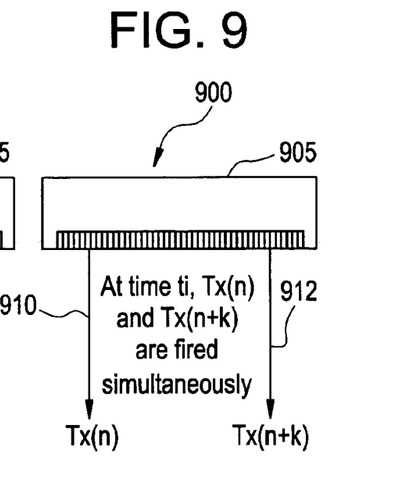
FIG. 9 illustrates a block diagram depicting still another method for transmitting beams in accordance with certain embodiments of the present invention.

FIG. 9 illustrates yet another embodiment of the present invention. This embodiment comprises multi-line transmission. More particularly, this embodiment, generally designated 900, is similar to multi-line acquisition illustrated in FIG. 7 as provided previously. In this embodiment, probe 905 transmits one or more separate pulses in the imaging field simultaneously. In at least one embodiment, the backscattered echoes of the pulses are received along the same beam path (not shown), filtered (using a filter for example) and saved in memory. In the illustrated embodiment, two separate vectors Tx(n) designated 910 and Tx(n+k) designated 912 are transmitted at time ti. The backscattered echoes are received, filtered (using a band pass filter for example) and coherently summed with the stored pulses. It is contemplated that using at least one embodiment of the present invention, the frame rate drop associated with pulse inversion may be avoided. Tx(n) and Tx(n+k) are far away enough apart to avoid acoustic cross talking.

It is also contemplated that embodiments of the present invention may accommodate faster frame rates than single firing bandpass filtering methods can accommodate. For example, one or more of the embodiments discussed previously may be combined to increase the frame rate. For example, the multi-line acquisition embodiment illustrated in FIG. 7 may be combined with the multi-line transmission embodiment illustrated in FIG. 9, doubling the frame rate.

In at least one embodiment of the present invention the ultra-wide band design of the pulse having a BW greater than about 80% enables a greater low frequency component in the transmit pulse, significantly improving both penetration and SNR. Acoustic attenuation is proportional to the frequency, where the log attenuation or atten(r) in dB may be modeled as:

$$\text{atten}(r) = 2far$$

where f represents the frequency, 2 represents the round trip, r represents the propagation distance and a represents the attenuation coefficient. Thus a pulse have a lower frequency penetrates tissue for example to an inversely deeper range with the same attenuation. Increasing the low frequency component enables penetration in at least two ways: a) deeper transmission may be achieved as described by the previously provided equation; and b) SNR and penetration improves in the receiving side as the generated second harmonic signal will have a spectrum falling inside the probe effective bandwidth. The improvement of the SNR helps the contrast resolution.

One embodiment of the present invention has an improved image resolution (spatial and contrast) in comparison to a single firing and regular pulse inversion methods. In at least one embodiment, pulse inversion is employed enabling ultra-wideband signals (BW greater than about 80%) to be transmitted. It is also contemplated that, by carefully designing the time bandwidth product, the point spread function will be much tighter and smoother in harmonic imaging compared to single firing band pass filtering case. Further, the improved SNR in the second harmonic signal may help surpass the leakage of the fundamental signal which in turn, may increases the contrast and spatial resolution in comparison to the regular pulse inversion.

It should be appreciated that Ultra-wide band transmission comprises more high frequency components in transmission, enabling the near field harmonic imaging performance. Such near field harmonic imaging performance may be understood by looking at harmonic generation in tissue having a second harmonic generation of a lossless, plane wave solution from a mono-frequency source. Such a harmonic generation in tissue having a second harmonic generation of a lossless, plane wave solution from a mono-frequency source may be represented by the following equation as disclosed in *Nonlinear Acoustics*, Hamilton MF, Blackstock DT.:

$$P_2 = \frac{\beta \rho_0^2 \omega}{2\rho_0 c^3} \times \sin(2\omega t)$$

where $P_2$ represents the second harmonic component, x represents the depth, $\rho_0$ represents the density of the propagation tissue, c represents the sound speed, $p_0$ represents the acoustic pressure at the source, $\beta$ represents the coefficient of nonlinearity, and $\omega$ represents the transmit angular frequency. From the above equation, it may be seen that the product of distance and frequency (x$\omega$) is proportional to the strength of $P_2$. Thus increasing the transmit frequency $\omega$ results in more second harmonic generation in the near field. The closer the distance to the transducer (i.e., probe) surface, the higher the transmit frequency needs to be.

One or more embodiments of the present invention only use a filter which may pass one or more selected frequencies while blocking or stopping the other frequencies, no costly matched decoding and compressing filters are used. I The decoding occurs naturally through propagation of coded pulses inside tissue and pulse inversion. First, in the near field, the lower frequency portion of the waveform produces very little harmonic response; only the high frequency portion produces significant harmonic echoes. Thus the duration of the harmonic signal is shortened. The low frequency portion is cancelled using pulse inversion and only the short duration harmonic signal generated by the high frequency portion contributes to the image.

Figure 10:
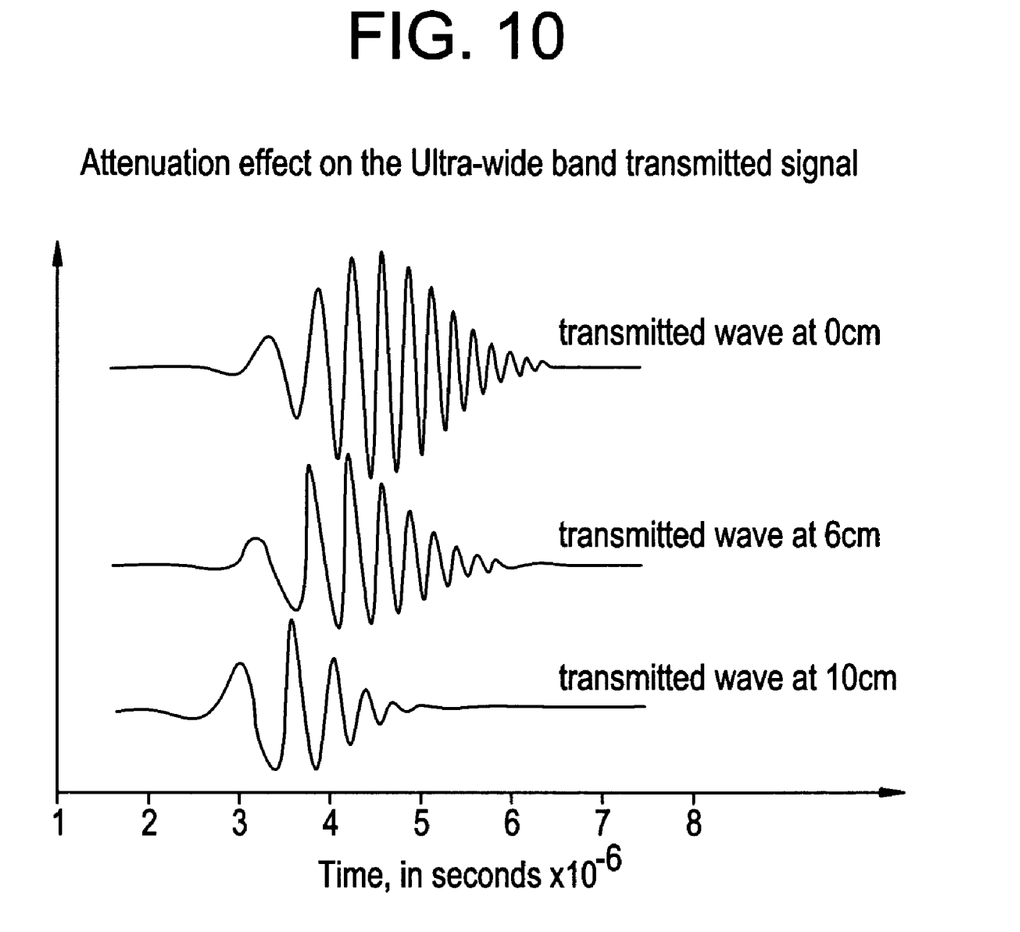
FIG. 10 illustrates examples of a pulse shortening during transmission in accordance with certain embodiments of the present invention.

Second, during transmission, the very high frequency component dissipates faster by attenuation, resulting in a shorter pulse as the wave propagates through the tissue. FIG. 10 illustrates one example of the pulse shortening (i.e., attenuation effect) on an ultra-wide band signal during transmission. It illustrates that a depth increase the pulse duration is shortened due to the attenuation of high frequency component. This will help tighten the point spread function in mid and far field regions.

Third, harmonic imaging has an inherently tighter and smoother point spread function relative to fundamental imaging. In fundamental imaging, coded excitation waveforms are designed to maximize penetration. Thus, generally coded excitation techniques (chirp for example) employ very long transmit waveforms and decoding filters. However, in at least one embodiment of the present invention, the coded excitation waveform of the transmit signal does not need to be very long, so that, when combined with pulse inversion, and the above mentioned effects, decoding is not necessary. However, it is understandable that although decoding may not be necessary, a mismatched filter, designed for improving the range side lobe level, may still be applied to the received echo. Herein the mismatched filter is different from the matched filter since it does not match the transmit code from the SNR maximization stand point.

In summary, at least one embodiment of the invention introduces wideband (BW greater than about 80%) coded excitation transmit signals with time bandwidth product greater than about 1 for harmonic imaging. At least one embodiment employs pulse inversion for removing fundamental overlapping effect, and further employs at least one of the Multi-line acquisition, Phase alternating in space, and Multi-line transmission methods (or a combination of two or more of such methods) to avoid the frame rate drop caused by double firing as provided previously. The wideband transmit signal improves the harmonic imaging performance in very near field while at the same time increases the penetration and SNR compared to a normal pulse inversion method where regular pulses (time bandwidth product=1) are employed. Decoding of the receiving signal is naturally implemented through tissue propagation and pulse inversion.

It is contemplated that embodiments of this invention may greatly improve the image resolution compared to single firing band pass filtering harmonic imaging method while maintaining the same or even better penetration and SNR as in single firing harmonic imaging, which greatly surpass the penetration of regular pulse inversion harmonic imaging.

It is also contemplated that embodiments of this invention employ one or more of the Multi-line acquisition, Phase alternating in space, and Multi-line transmission methods (or a combination of two or more of such methods). As a result, no frame rate sacrificing is necessary for the much higher resolution benefit compared to the single firing band pass filtering harmonic imaging.

Yet another embodiment this invention combines ultra-wide band waveform, phase inversion and tissue attenuation, which result in natural compressing of the receiving harmonic signal, benefiting from coded excitation for improvement of near filed harmonic imaging performance, better SNR and better penetration, avoiding the need of expensive decoding filter.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for conducting harmonic imaging without using a matched decoding and compressing filter comprising:
    transmitting a coded pulse having a time bandwidth product greater than about 1 and a phase inverted version of said coded pulse;
    receiving at least a backscattered echo of said coded pulse and at least a backscattered echo of said phase inverted version of said coded pulse;
    decoding said backscattered echo of said coded pulse and said backscattered echo of said phase inverted version of said coded pulse, wherein said decoding occurs naturally through:
    A. propagation of at least said coded pulse and said phase inverted version of said coded pulse inside tissue; and
    B. said coherent summation of said backscattered echo of said coded pulse with said backscattered echo of said phase inverted version of said coded pulse; and
    coherently summing said at least a backscattered echo of said coded pulse with said at least a backscattered echo of said phase inverted version of said coded pulse.

2. The method of claim 1 further comprising filtering said backscattered echoes of said coded pulse and said phase inverted version of said coded pulse before or after said coherent summing using a filter which passes at least one selected frequency and blocks at least one other frequency.

3. The method of claim 2 wherein said filter comprises at least one of a bandpass filter, a base band low pass filter and a mismatched filter.

4. The method of claim 1 wherein at least said coded pulse comprises at least one ultrawide band frequency modulated pulse having a bandwidth greater than about 80%.

5. The method of claim 1 wherein at least said coded pulse comprises at least one frequency modulated pulse having a bandwidth less than about 80%.

6. The method of claim 1 wherein at least said coded pulse is at least one of a linear frequency modulated pulse and non-linear frequency modulated pulse.

7. The method of claim 1 wherein said coded pulse comprises at least one of an amplitude modulated pulse and a frequency modulated pulse.

8. The method of claim 1 wherein a center frequency of said at least one pulse is selected such that a second harmonic signal is generated having a center frequency falling within a predetermined bandwidth range of a probe.

9. A method for conducting harmonic imaging using an ultrasound machine without using a matched decoding and compressing filter comprising:
    transmitting at least one coded pulse having a time bandwidth product greater than about 1 along a transmit beam path;
    receiving at least two backscattered echoes of said transmitted coded pulse along opposing sides of said transmit beam path;
    forming at least one phase inverted version of said at least one coded pulse;
    transmitting said at least one phase inverted version of said at least one coded pulse;
    receiving at least two backscattered echoes of said at least one phase inverted version of said coded pulse along opposing sides of a transmit beam path;

decoding said backscattered echoes of said coded pulses and said backscattered echoes of said phase inverted version of said coded pulses, wherein said decoding occurs naturally through:
A. propagation of said at least one coded pulse and said at least one phase inverted version of said at least one coded pulse in tissue; and
B. said coherent summation of said at least two backscattered echoes of said transmitted coded pulse with said at least two backscattered echoes of said at least one phase inverted version of said coded pulse; and
coherently summing said at least two backscattered echoes of said coded pulse with said at least two backscattered echoes of said phase inverted version of said coded pulse forming at least two coherent sums.

10. The method of claim 9 further comprising filtering at least one of said at least two backscattered echoes of said coded pulse and said at least two backscattered echoes of said phase inverted version of said coded pulse before or after said coherent summing using a filter which passes at least one selected frequency and blocks at least one other frequency.

11. The method of claim 10 wherein said filter comprises at least one of a bandpass filter, a base band low pass filter and a mismatched filter.

12. The method of claim 9, wherein said opposing sides comprise right and left sides of said transmit beam path.

13. The method of claim 9 wherein at least said coded pulse comprises at least one ultrawide band frequency modulated pulse.

14. The method of claim 13 wherein said ultrawide band frequency modulated pulse has a bandwidth greater than about 80%.

15. The method of claim 13 wherein said coded pulse comprises at least one frequency modulated pulse having a bandwidth less than about 80%.

16. The method of claim 9 wherein at least said coded pulse is at least one of a linear frequency modulated pulse and non-linear frequency modulated pulse.

17. The method of claim 9 wherein at least said coded pulse is at least one of amplitude modulated pulse and frequency modulated pulse.

18. A method for conducting harmonic imaging using an ultrasound machine without using a matched decoding and compressing filter comprising:
transmitting at least one coded pulse having a time bandwidth product greater than about one along a first beam path;
receiving at least one backscattered echo of said transmitted coded pulse;
forming at least one phase inverted version of said at least one coded pulse;
transmitting said at least one phase inverted version of said at least one coded pulse along a second beam path;
receiving at least one backscattered echo of said at least one phase inverted version of said coded pulse;
decoding said backscattered echo of said coded pulse and said backscattered echo of said phase inverted version of said coded pulse, wherein said decoding occurs naturally through:
A. propagation of said at least one coded pulse and said at least one phase inverted version of said at least one coded pulse in tissue; and
B. said coherent summation of said at least one backscattered echo of said coded pulse with said at least one backscattered echo of said phase inverted version of said coded pulse; and coherently summing said at least one backscattered echo of said coded pulse with said at least one backscattered echo of said phase inverted version of said coded pulse, forming at least a received echo along a third beam path in spaced relationship to said first and second beam paths.

19. The method of claim 18 further comprises filtering at least one of said at least one backscattered echo of said coded pulse and said at least one backscattered echo of said phase inverted version of said coded pulse before or after said coherent summation using a filter which passes at least one selected frequency and blocks at least one other frequency.

20. The method of claim 19 wherein said filter comprises at least one of a bandpass filter, a base band low pass filter and a mismatched filter.

21. The method of claim 18 wherein at least said second beam path is spatially adjacent to at least said first beam path.

22. The method of claim 18 wherein at least said third beam path is spaced between said first and second beam paths.

23. The method of claim 18 wherein at least said coded pulse comprises at least one ultrawide band frequency modulated pulse having a bandwidth greater than about 80%.

24. The method of claim 18 wherein at least said coded pulse comprises at least one frequency modulated pulse having a bandwidth less than about 80%.

25. The method of claim 18 wherein at least said coded pulse is at least one of a linear frequency modulated pulse and non-linear frequency modulated pulse.

26. The method of claim 18 wherein at least said coded pulse is at least one of amplitude modulated pulse and a frequency modulated pulse.

27. A method for conducting harmonic imaging using an ultrasound machine without using a matched decoding and compressing filter comprising:
simultaneously transmitting at least two coded pulses having a time bandwidth product greater than about 1 along two separate beam paths;
receiving at least two backscattered echoes of said two transmitted coded pulses;
forming at least two phase inverted versions of said coded pulses;
simultaneously transmitting said two phase inverted versions of said coded pulses along said two beam paths;
receiving at least two backscattered echoes of said two phase inverted versions of said coded pulses;
decoding said backscattered echoes of said coded pulses and said backscattered echoes of said phase inverted version of said coded pulses, wherein said decoding occurs naturally through:
A. propagation of said at least two coded pulses and said at least two phase inverted versions of said coded pulses in tissue; and
B. said coherent summation of said at least said two backscattered echoes of said coded pulses with said two backscattered echoes of said two phase inverted versions of said coded pulses; and
coherently summing said at least two backscattered echoes of said coded pulses with said at least two backscattered echoes of said two phase inverted versions of said coded pulses, forming two summed echoes along said two beam paths.

28. The method of claim 27 further comprises filtering at least one of said two backscattered echoes of said coded pulses and said two backscattered echoes of said two phase inverted versions of said coded pulses before or after said coherent summation using a filter which passes at least one selected frequency and blocks at least one other frequency.

29. The method of claim 28 wherein said filter comprises at least one of a bandpass filter, a base band low pass filter and a mismatched filter.

30. The method of claim 27 wherein said two beam paths are spatially separated.

31. The method of claim 27 wherein said coded pulses comprise ultrawide band frequency modulated pulses having a bandwidth greater than about 80%.

32. The method of claim 27 wherein said coded pulses comprise frequency modulated pulses having a bandwidth less than about 80%.

33. An ultrasound apparatus for providing tissue harmonic imaging of tissue using natural decoded coded excitation and without using a matched decoding and compressing filter, said apparatus comprising:
  a probe arranged to transmit at least one coded pulse and a phase inverted version of said coded pulse into tissue, generating at least one received signal in response to at least one echo of said coded pulse and at least one echo of said phase inverted versions of said coded pulse backscattered from the tissue; and
  a coherent summation module adapted to coherently sum at least one of said backscattered echoes of said coded pulse with at least one of said backscattered echoes of said phase inverted version of said coded pulse forming at least one coherent sum,
  wherein said backscattered echoes of said coded pulse and said backscattered echoes of said phase inverted version of said coded pulse are decoded naturally through
    A. propagation of said coded pulse and said phase inverted version of said coded pulse in tissue; and
    B. coherently summing said two backscattered echoes of said coded pulse with said backscattered echoes of said phase inverted version of said coded pulse.

34. The apparatus of claim 33 further comprising a filtering module coupled to at least said coherent summation module and adapted to pass at least one selected frequency and block at least one other frequency.

35. The apparatus of claim 33 further comprising at least one multiline transmitter adapted to transmit at least a plurality of pulses along at least one of a beam path and a plurality of beam paths.

36. The apparatus of claim 33 further comprising at least one multi-line receiver adapted to receive at least one echo or a plurality of echoes of a transmitted pulse along a beam path or a plurality of beams paths.

* * * * *